(12) United States Patent
Tao et al.

(10) Patent No.: US 10,669,009 B2
(45) Date of Patent: Jun. 2, 2020

(54) DRIVING DEVICE, PROPELLER AND PROPULSION SYSTEM

(71) Applicant: SZ DJI TECHNOLOGY CO., LTD., Shenzhen (CN)

(72) Inventors: Ye Tao, Shenzhen (CN); Tao Deng, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 461 days.

(21) Appl. No.: 15/589,017

(22) Filed: May 8, 2017

(65) Prior Publication Data

US 2017/0240267 A1     Aug. 24, 2017

Related U.S. Application Data

(63) Continuation of application No. PCT/CN2014/090735, filed on Nov. 10, 2014.

(51) Int. Cl.
| | | |
|---|---|---|
| *B64C 11/04* | (2006.01) | |
| *B64D 35/00* | (2006.01) | |
| *B64C 11/02* | (2006.01) | |
| *F16D 1/112* | (2006.01) | |

(Continued)

(52) U.S. Cl.
CPC ............ *B64C 11/04* (2013.01); *B63H 1/20* (2013.01); *B64C 11/02* (2013.01); *B64D 35/00* (2013.01); *F16D 1/112* (2013.01); *B64C 39/024* (2013.01); *B64C 2201/042* (2013.01); *B64C 2201/108* (2013.01); *B64C 2201/165* (2013.01)

(58) Field of Classification Search
CPC ......... B64C 11/04; B64C 11/08; B64C 11/02; B64C 2201/024; A63H 27/02; A63H 27/12; F04D 29/263
See application file for complete search history.

(56) References Cited

U.S. PATENT DOCUMENTS

| | | | |
|---|---|---|---|
| 4,606,671 A | 8/1986 | Rasmussen | |
| 5,135,358 A | * 8/1992 | Myers | ...................... B63H 1/20 |
| | | | 416/244 B |

(Continued)

FOREIGN PATENT DOCUMENTS

| | | |
|---|---|---|
| CN | 1019657 B | 12/1992 |
| CN | 201080097 Y | 7/2008 |

(Continued)

OTHER PUBLICATIONS

The World Intellectual Property Organization (WIPO) International Search Report for PCT/CN2014/090735 dated Mar. 2, 2015 6 Pages.

*Primary Examiner* — Justin D Seabe
(74) *Attorney, Agent, or Firm* — Anova Law Group, PLLC

(57) ABSTRACT

A propulsion system comprises a propeller and a driving device coupled with the propeller. The propeller comprises a hub having a receiving hole, a plurality of blades connected to the hub, and a connecting surface. The driving device comprises a body portion, an elastic abutting member disposed on the body portion and configured to abut against the connecting surface, and a lock portion disposed on the body portion and including a first snap-fitting portion. A second snap-fitting portion is arranged on an inner wall of the receiving hole and is configured to snap with the first snap-fitting portion.

20 Claims, 4 Drawing Sheets

(51) Int. Cl.
*B63H 1/20* (2006.01)
*B64C 39/02* (2006.01)

(56) References Cited

U.S. PATENT DOCUMENTS

| | | | | |
|---|---|---|---|---|
| 5,252,028 A * | 10/1993 | LoBosco | ............. | B63H 1/20 |
| | | | | 416/134 R |
| 6,685,432 B2 * | 2/2004 | Chen | ............. | B63H 1/20 |
| | | | | 416/134 R |
| 8,152,484 B2 * | 4/2012 | Bilodeau | ............. | F16D 1/116 |
| | | | | 416/169 A |
| 8,430,709 B1 * | 4/2013 | Wong | ............. | A63H 27/02 |
| | | | | 446/34 |
| 9,079,115 B2 * | 7/2015 | Huang | ............. | A63H 27/02 |
| 2002/0090299 A1 | 7/2002 | Chuang | | |
| 2006/0099838 A1 | 5/2006 | Meyers | | |
| 2014/0133898 A1 | 5/2014 | Tussing | | |
| 2014/0271222 A1 | 9/2014 | Maresh et al. | | |
| 2017/0305542 A1 * | 10/2017 | Zhang | ............. | B64C 11/02 |

FOREIGN PATENT DOCUMENTS

| | | |
|---|---|---|
| CN | 101421157 A | 4/2009 |
| CN | 203127144 U | 8/2013 |
| CN | 203714173 U | 7/2014 |
| CN | 203832751 U | 9/2014 |
| EP | 1709932 A1 | 10/2006 |
| GB | 485978 A | 5/1938 |
| JP | H0952599 A | 2/1997 |
| WO | 2011009702 A1 | 1/2011 |

* cited by examiner

DRIVING DEVICE, PROPELLER AND PROPULSION SYSTEM

CROSS-REFERENCE TO RELATED APPLICATION

This is a continuation application of International Application No. PCT/CN2014/090735, filed on Nov. 10, 2014, the entire contents of which are incorporated herein by reference.

TECHNICAL FIELD

The present disclosure relates to a driving device, a propeller and a propulsion system using the same.

BACKGROUND OF THE DISCLOSURE

A propeller is generally used as a propulsor for use in aerial vehicles, ships, or other devices. The propeller generally includes blades and a hub, the blades are mounted on the hub, and at the same time, a driving shaft is connected with the hub. The driving shaft rotates under the action of a motor to drive the blades to rotate together. At present, the hub and the driving shaft are fixedly connected with each other generally through threaded close-fit.

When the hub and a rotary shaft are fixed through the threaded close-fit, a tightening direction of the hub is the same as a rotation direction of the blades during operation, and the blades are in a good connection with the rotary shaft in startup and during operation. However, in the event that the blades suddenly slow down or the acceleration varies significantly, under the action of the acceleration, the hub could easily become loosened and come off the driving shaft. In addition, in the event of great vibration amplitude, the hub could easily become loosened and come off the driving shaft, resulting in a propeller runaway. In addition, after a crash occurs, only by a tool can the propeller be unscrewed.

SUMMARY OF THE DISCLOSURE

In view of this, the present disclosure provides a driving device easy to disassemble and having a lock mechanism, a propeller and a propulsion system using the same.

In accordance with the disclosure, there is provided a driving device for connecting with a propeller, the driving device including a body portion and a driving shaft disposed at the body portion and rotatable relative to the body portion, wherein the driving device further includes an elastic abutting member disposed on the body portion and a lock portion disposed on the body portion, the lock portion is provided thereon with at least one first snap-fitting portion for being clamped with the propeller, and the elastic abutting member is used for abutting against the propeller when the first snap-fitting portion is snapped with the propeller.

In some embodiments, the driving device further includes a mounting base, and the body portion is fixedly arranged at the mounting base.

In some embodiments, the body portion includes a carrying surface away from the mounting base, and the carrying surface is provided thereon with a round receiving groove.

In some embodiments, the elastic abutting member includes a connecting plate and a plurality of elastic abutting portions elastically bonding relative to the connecting plate, the connecting plate is received in the receiving groove, and the elastic abutting portions are used for abutting against the propeller when the first snap-fitting portion is snapped with the propeller.

In some embodiments, the bottom of the receiving groove is provided with a plurality of first mounting holes which surround the driving shaft. The first mounting holes are threaded holes. The connecting plate is provided with a plurality of second mounting holes corresponding to positions of the plurality of first mounting holes. The lock portion includes a bottom plate provided with a plurality of third mounting holes corresponding to the positions of the plurality of first mounting holes. Two bolts pass through the second mounting holes and the third mounting holes to be connected with the first mounting holes by threading to fix the elastic abutting member and the lock portion onto the carrying surface.

In some embodiments, the connecting plate is provided with a first through hole corresponding to the position of the driving shaft. The bottom plate is provided with a second through hole corresponding to the position of the driving shaft. The first through hole and the second through hole are both used for the driving shaft to pass through.

In some embodiments, the elastic abutting portion and the lock portion are both fixed onto the carrying surface by adhesion or welding.

In some embodiments, the thickness of the connecting plate is the same as the depth of the receiving groove.

In some embodiments, the lock portion includes an extension portion extending upwards along a direction perpendicular to the bottom plate, and the first snap-fitting portion is disposed on the extension portion.

In some embodiments, the extension portion is further provided thereon with at least two notches.

In some embodiments, the elastic abutting member is an elastic element disposed on the carrying surface.

In some embodiments, the elastic element is two or more springs.

In some embodiments, the elastic element is at least one rubber.

Also in accordance with the disclosure, there is provided a propeller for connecting with a driving device, the propeller including a hub and a plurality of blades connected to the hub, the hub being provided with a receiving hole, the receiving hole being provided with a cylindrical connecting post, the connecting post being provided thereon with a connecting hole for connecting with a driving shaft of the driving device, and the propeller including a connecting surface, wherein the connecting surface is used for abutting against an elastic abutting member of the driving device, an inner wall of the receiving hole corresponds to at least one second snap-fitting portion snapped with the driving device, wherein the at least one second snap-fitting portion is provided thereon with a first stopping block disposed along a rotation direction of the blades during operation.

In some embodiments, an outer sidewall of the connecting post is provided thereon with at least one reinforcing plate.

In some embodiments, the second snap-fitting portion is an arc-shaped snapping block.

In some embodiments, one end of the snapping block away from the first stopping block is provided with a second stopping block.

In some embodiments, the height of the first stopping block is greater than that of the second stopping block.

Also in accordance with the disclosure, there is provided a propulsion system comprising a propeller and a driving device coupled with the propeller. The propeller comprises a hub having a receiving hole, a plurality of blades connected to the hub, and a connecting surface. The driving device comprises a body portion, an elastic abutting member disposed on the body portion and configured to abut against the connecting surface, and a lock portion disposed on the body portion and including a first snap-fitting portion. A second snap-fitting portion is arranged on an inner wall of the receiving hole and is configured to snap with the first snap-fitting portion.

In some embodiments, a stopping block is disposed on the second snap-fitting portion along a rotation direction of the blades during operation.

In some embodiments, a cylindrical connecting post is arranged inside the receiving hole and includes a connecting hole configured to connect with a driving shaft of the driving device.

In some embodiments, at least one reinforcing plate is disposed on an outer sidewall of the connecting post.

In some embodiments, the driving shalt is connected with the connecting hole through interference fit.

In some embodiments, the driving device further comprises a mounting base, and the body portion is fixedly arranged at the mounting base.

In some embodiments, the body portion comprises a carrying surface away from the mounting base, and the carrying surface includes a round receiving groove.

In some embodiments, the elastic abutting member comprises a connecting plate received in the receiving groove. A plurality of elastic abutting portions elastically bending relative to the connecting plate and configured to abut against the propeller when the first snap-fitting portion is snapped with the propeller.

In some embodiments, a plurality of first mounting, holes surrounding the driving shaft are provided at a bottom of the receiving groove. The first mounting holes are threaded holes. The connecting plate includes a plurality of second mounting, holes corresponding to positions of the plurality of first mounting holes. The lock portion comprises a bottom plate including a plurality of third mounting holes corresponding to the positions of the plurality of first mounting holes. Two bolts pass through the second mounting holes and the third mounting holes to be connected with the first mounting holes by threading to fix the elastic abutting member and the lock portion on the carrying surface.

In some embodiments, the connecting plate includes a first through hole corresponding to a position of the driving shaft, the bottom plate includes a second through bole corresponding to the position of the driving shaft, and the first through hole and the second through bole are configured for the driving shaft to pass through.

In some embodiments, the elastic abutting member is an elastic element disposed on the carrying surface.

In some embodiments, the elastic element includes two or more springs.

In some embodiments, the elastic element includes at least one rubber.

In some embodiments, the elastic abutting portion and the lock portion are fixed on the carrying surface by adhesion or welding.

In some embodiments, a thickness of the connecting plate is about the same as a depth of the receiving groove.

In some embodiments, the lock portion comprises an extension portion extending upwards along a direction perpendicular to a bottom plate of the lock portion, and the first snap-fitting portion is disposed on the extension portion.

In some embodiments, the extension portion further includes at least two notches.

In some embodiments, the second snap-fitting portion is an arc-shaped snapping block.

In some embodiments, a first stopping block is disposed on the second snap-fitting portion along a rotation direction of the blades during operation, a second stopping block is provided at one end of the snapping block away from the first stopping block, and the first snap-fitting portion is clamped between the first stopping block and the second stopping block.

In some embodiments, a height of the first stopping block is greater than a height of the second stopping block.

Compared with the conventional technology, the driving device of the propulsion system according to the present disclosure is provided thereon with an elastic abutting member and a lock portion. The lock portion is provided thereon with at least one first snap-fitting portion for being clamped with the propeller, and an inner wall of the receiving hole of the propeller is provided thereon with at least one second snap-fitting portion snapped with the first snap-fitting portion. The elastic abutting member is used for abutting against the connecting surface. Such a structural design is not only easy to disassemble but also has a locking function, which, in addition, can prevent the propeller from coming off and leading to a propeller runaway.

DETAILED DESCRIPTION OF THE EMBODIMENTS

The technical solution in embodiments of the present disclosure is clearly and completely described below with reference to the accompanying drawings in the embodiments of the present disclosure. It is apparent that the embodiments described are merely some embodiments of the present disclosure instead of all the embodiments. Based on the embodiments in the present disclosure, all other embodiments obtained by persons of ordinary skill in the art without making creative efforts all fall within the protection scope of the present disclosure.

Implementation of the present disclosure is described below in detail with reference to specific implementation manners.

Figure 1:
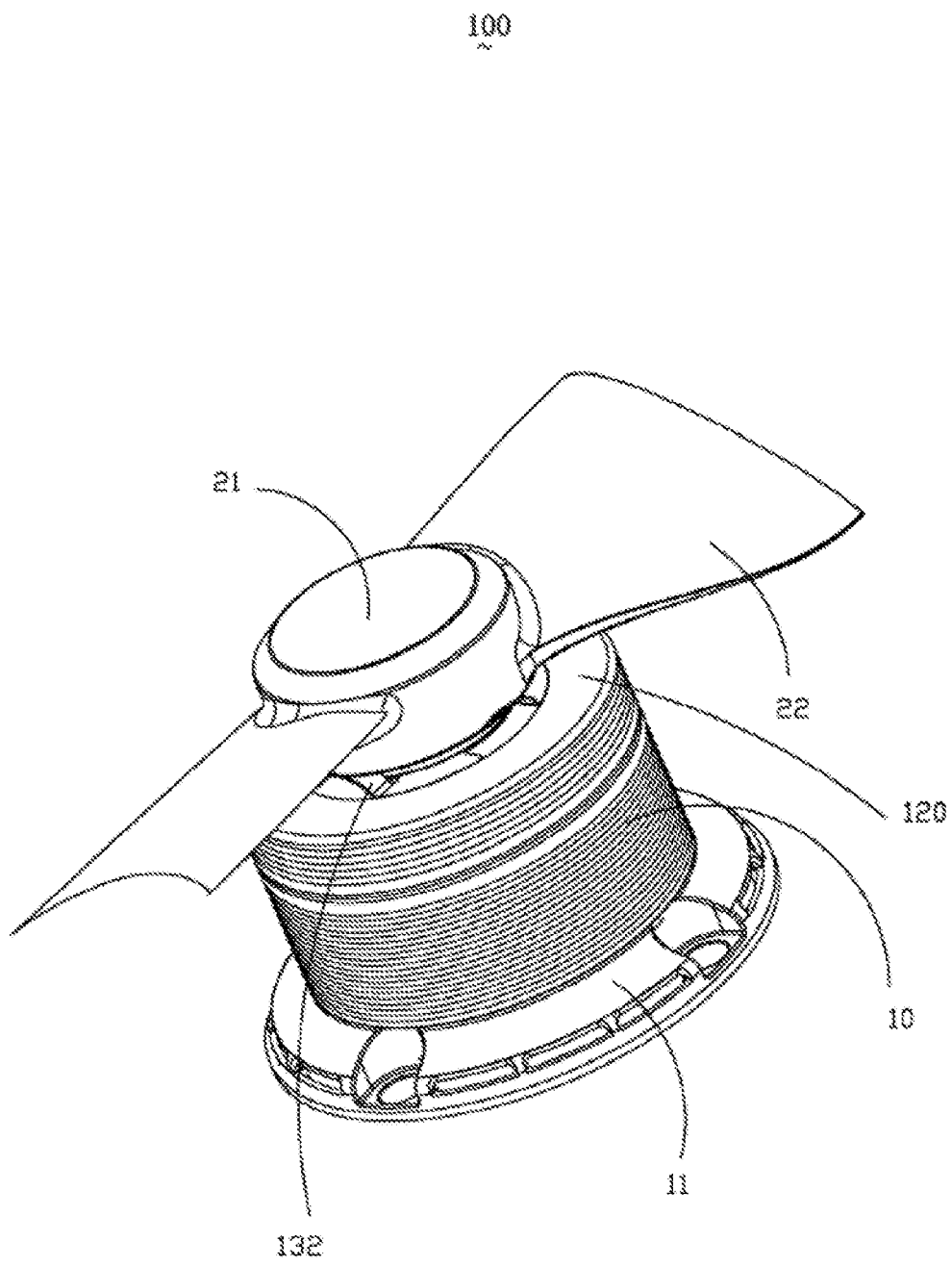
FIG. 1 is a schematic three-dimensional assembly diagram of a propulsion system according to an implementation manner of the present disclosure.
Figure 2:
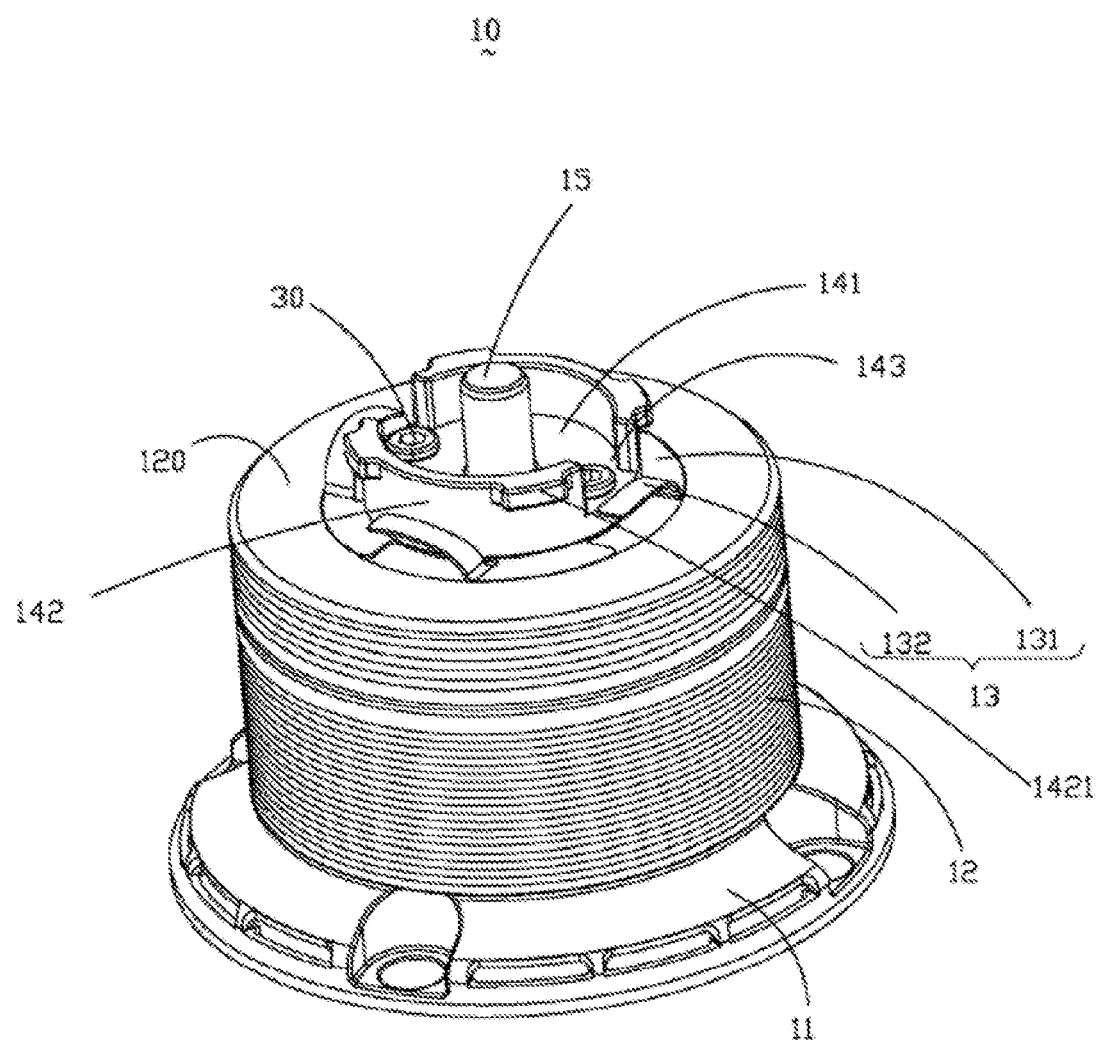
FIG. 2 is a schematic three-dimensional assembly diagram of the driving device in FIG. 1.
Figure 3:
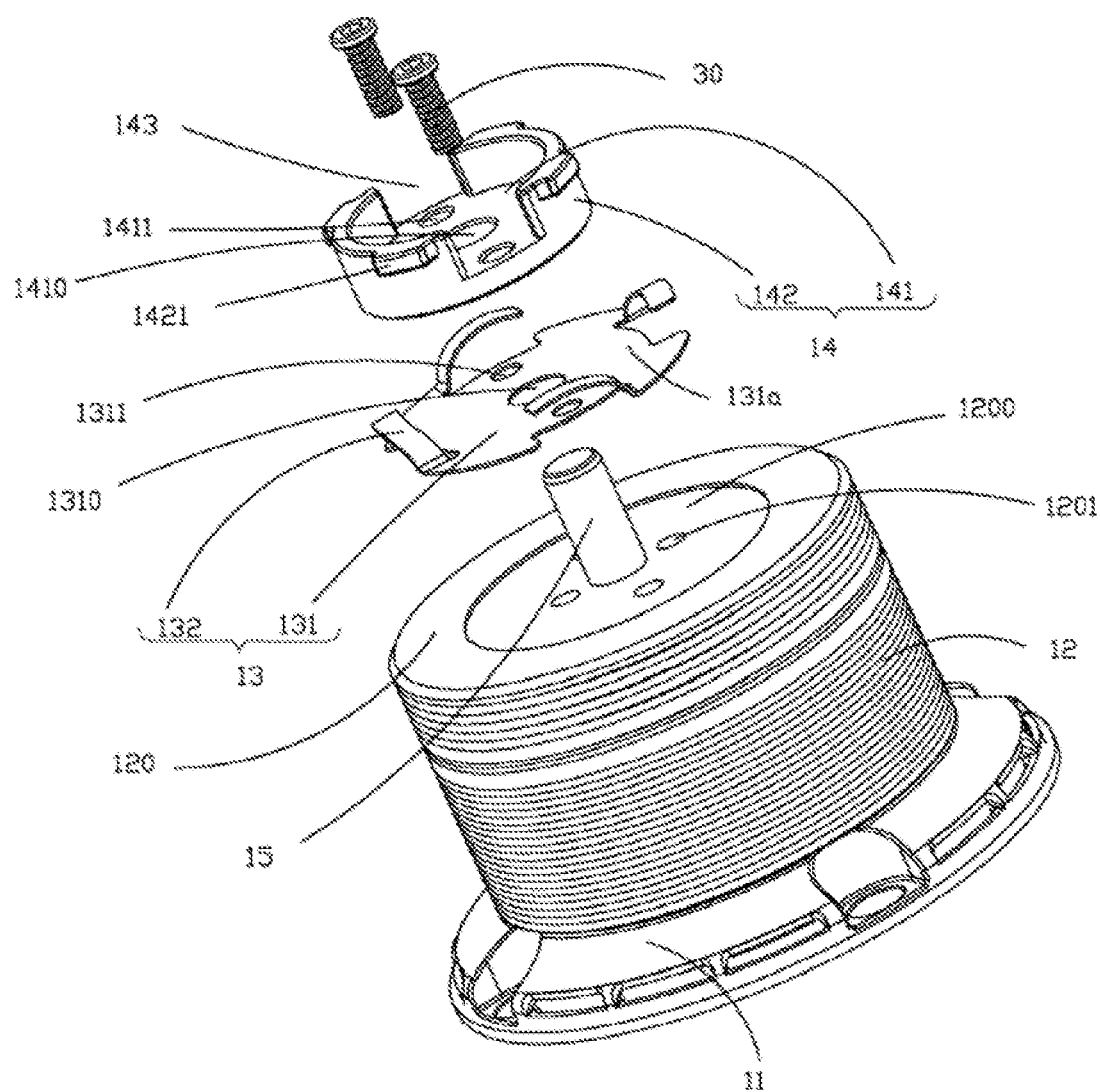
FIG. 3 illustrates the driving device in FIG. 2.
Figure 4:
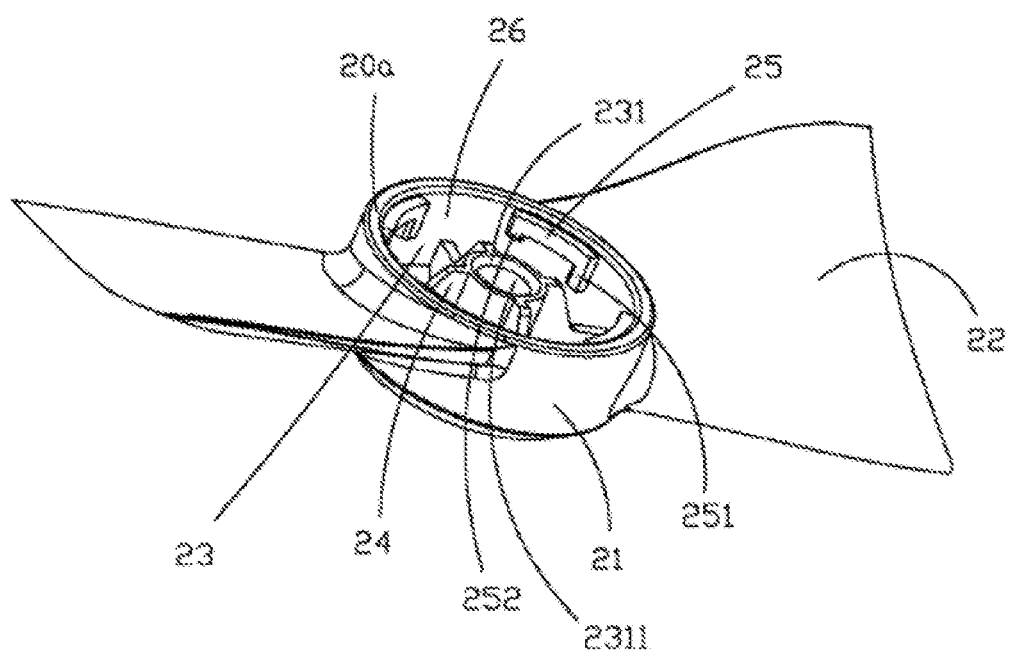
FIG. 4 is a schematic three-dimensional assembly diagram of the propeller in FIG. 1.

Referring to FIGS. 1-4 together, a propulsion system 100 in the implementation manner of the present disclosure includes a driving device 10 and a propeller 20. The driving device 10 is connected with the propeller 20 for driving the propeller 20 to rotate, and the propulsion system 100 may be used in unmanned aerial vehicles, unmanned ships, or the like.

The driving device 10 includes a mounting base 11, a body portion 12 fixedly arranged on the mounting base 11, an elastic abutting member 13 disposed on the body portion 12, a lock portion 14 disposed on the body portion 12, and a driving shaft 15 disposed on the body portion 12 and rotatable relative to the body portion 12.

The body portion 12 includes a carrying surface 120 away from the mounting base 11. In this embodiment, the body portion 12 is cylindrical, and the driving shaft 15 protrudes beyond a center position of the body portion 12. The carrying surface 120 is provided thereon with a round receiving groove 1200. The bottom of the receiving groove 1200 is provided with a plurality of first mounting holes 1201 which surround the driving shaft 15. In this embodiment, the first mounting holes 1201 are threaded holes.

It can be understood that the receiving groove 1200 is not limited to a round shape, which may also be set according to actual requirements, for example, a square, a triangle, or the like.

The elastic abutting member 13 includes a connecting plate 131 and a plurality of elastic abutting portions 132 elastically bending relative to the connecting plate 131.

The shape and size of the connecting plate 131 correspond to those of the receiving groove 1200 respectively. In this embodiment, the connecting plate 131 corresponds to a round shape. The connecting plate 131 is provided with a first through hole 1310 corresponding to the position of the driving shaft 15 for the driving shaft 15 to pass through. The connecting plate 131 is provided with a plurality of second mounting holes 1311 corresponding to positions of the plurality of first mounting holes 1201. The plurality of second mounting holes 1311 correspond one-to-one to the plurality of first mounting holes 1201. In this embodiment, the thickness of the connecting plate 131 is approximately the same as the depth of the receiving groove 1200 to cause the connecting plate 131, after being completely received in the receiving groove 1200, to be flush with the carrying surface 120.

The elastic abutting portions 132 protrude beyond a first surface 131a of the connecting plate 131 away from the bottom of the receiving groove 1200. In this embodiment, the number of the elastic abutting portions 132 is four, which are equally spaced and evenly distributed on the first surface 131a, respectively. It can be understood that, in other embodiments, the number of the elastic abutting portions 132 is not limited to four, which may be two, three, or more than four.

The lock portion 14 includes a bottom plate 141 and an extension portion 142 extending upwards along a direction perpendicular to the bottom plate 141.

The bottom plate 141 is provided with a second through hole 1410 corresponding to the position of the driving shaft 15 for the driving shaft 15 to pass through. The bottom plate 141 is provided with a plurality of third mounting holes 1411 corresponding to positions of the plurality of first mounting holes 1201. The plurality of third mounting holes 1411 correspond one-to-one to the plurality of first mounting holes 1201.

The extension portion 142 is provided with four first snap-fitting portions. In this embodiment, the four first snap-fitting portions are arc-shaped first snapping blocks 1421 extending along an outer side surface of the extension portion 142, respectively, and the four first snapping blocks 1421 are evenly distributed on the outer side surface of the extension portion 142. The extension portion 142 is further provided thereon with two notches 143. It can be understood that, in other embodiments, the number of the notches 143 may be set according to actual requirements, for example, three or more, which is not limited to the implementation.

During assembly, at first, the connecting plate 131 is placed in the receiving groove 1200, the rotating shaft 15 penetrates the first through hole 1310, and the plurality of second mounting holes 1311 are aligned with the first mounting holes 1201, respectively. Next, the lock portion 14 is placed on the first surface 131a of the connecting plate 131, and the plurality of third mounting holes 1411 are aligned with the second mounting holes 1311, respectively. Finally, two bolts 30 pass through the second mounting holes 1311 and the third mounting holes 1411 and are connected with the first mounting holes 1201 by threading, so as to fix the elastic abutting member 13 and the lock portion 14 onto the carrying surface 120. The four elastic abutting portions 132 are all located at the periphery of the lock portion 14. That is, the four elastic abutting portions 132 surround the lock portion 14.

It can be understood that, in other implementation manners, it is also feasible to fix the elastic abutting member 13 and the lock portion 14 onto the carrying surface 120 by adhesion or welding.

It can be understood that the receiving groove 1200 may be omitted and the elastic abutting member 13 is directly fixedly arranged on the carrying surface 120.

The propeller 20 includes a hub 21 and two or more blades 22 connected to the hub 21. The hub 21 is removably arranged at the lock portion 14. A connecting surface 20a where the hub 21 is arranged oppositely to the carrying surface 120 is provided thereon with a receiving hole 23, and the shape and size of the receiving hole 23 correspond to those of the lock portion 14 respectively. That is, the receiving hole 23 matches the lock portion 14. In this implementation manner, the hub 21 and the blades 22 are integrally injection-molded. The receiving hole 23 is internally provided with a cylindrical connecting post 231. The connecting post 231 is provided thereon with a connecting hole 2311 for receiving the driving shaft 15. In this embodiment, in order to reinforce connection stiffness between the connecting hole 2311 and the driving shaft 15 and avoid breakage of the connecting post 231 in case of a crash, an outer sidewall of the connecting post 231 is provided thereon with four reinforcing plates 24. The four reinforcing plates 24 are evenly distributed on the outer sidewall of the connecting post 231. It can be understood that the number of the reinforcing plates 24 is not limited to four, which may be designed as required, for example, two, three, or more than four, and is not limited to this embodiment.

In this embodiment, an inner wall of the receiving hole 23 is provided thereon with four second snap-fitting portions corresponding to positions of the four first snap-fitting portions. The second snap-fitting portions are arc-shaped snapping blocks 25, and the snapping blocks 25 match the first snapping blocks 1421. Two ends of each of the snapping blocks 25 are provided with a first stopping block 251 and a second stopping block 252, respectively. The height of the first stopping block 251 is greater than that of the second stopping block 252. The first stopping block 251 is disposed along a rotation direction of the blades 22 during operation. For example, when the propeller 20 of the propulsion system 100 rotates clockwise, the first stopping block 251 is disposed on the right side of the snapping block 25; otherwise, the first stopping block 251 is disposed on the left side of the snapping block 25. An assemble-in opening 26 is formed between each two adjacent snapping blocks 25.

It can be understood that, in other embodiments, it is not necessary that the four snapping blocks 25 are all provided with the first stopping block 251 and the second stopping block 252. It is feasible that at least one snapping block 25 is provided with the first stopping block 251 and the second stopping block 252. For example, two of the snapping blocks 25 are both provided with the first stopping block 251 and the second stopping blocks 252, while the other two are not provided with the first stopping block 251 and the second stopping block 252; or one of the snapping blocks 25 is provided with the first stopping block 251 and the second stopping block 252, while the other three are not provided with the first stopping block 251 and the second stopping block 252; or three of the snapping blocks 25 are all provided with the first stopping block 251 and the second stopping block 252, while the other one is not provided with the first stopping block 251 and the second stopping block 252. These arrangements are not limited to this embodiment.

During assembly, at first, the driving shaft 15 is assembled into the connecting hole 2311 through interference fit to ascertain concentricity and verticality between the propeller 20 and the driving device 10. The first snapping block 1421 is assembled into the receiving hole 23 through the assemble-in opening 26 of the propeller 20. At this point, two of the snapping blocks 25 are received in two of the notches 143 on the extension portion 142, respectively. In this embodiment, the provision of the two notches 143 is to facilitate positioning during assembling-in of the propeller 20. Afterwards, the hub 21 of the propeller 20 is pressed down, the elastic abutting portion 132 is pressed down and deformed by the connecting surface 20a, and the propeller 20 is rotated in the assemble-in direction to make the first snapping block 1421 cross over the second stopping block 252 to be assembled-in between the second stopping block 252 and the first stopping block 251. When the propeller 20 is released from being pressed down, as the elastic abutting portion 132 elastically abuts against the connecting surface 20a due to the elastic force of the elastic abutting portion 132, each first snapping block 1421 is correspondingly snapped between the first stopping block 251 and the second stopping block 252 of the snapping block 25, and the propeller 20 is in a lock state.

When it is necessary to remove the propeller 20 from the driving device 10, the hub 21 is pressed down, and the elastic abutting portion 132 is pressed down and deformed by the connecting surface 20a, causing the first snapping block 1421 to cross over the second stopping block 252. At this point, the propeller 20 is in an unlock state. The propeller 20 is rotated in a direction opposite to the assemble-in direction. The snapping block 25 is detached from the side of the second stopping block 252, and the first snapping block 1421 retreats to the assemble-in opening 26, so as to achieve separation of the propeller 20 from the driving device 10.

It can be understood that, in other embodiments, the number of the first snapping blocks 1421 is not limited to four, which may also be one, two, three or, more than four. It is also feasible to provide one first snapping block 1421, and the number of the snapping block 25 is the same as that of the first snapping block 1421. When the number of the first snapping block 1421 and the number of the snapping block 1421 are both one, the arc length of the first snapping block 1421 is about three quarters of the circumference of the cylindrical lock portion 14, while the arc length of the snapping block 25 is approximately the same as that of the first snapping block 1421.

It can be understood that, in other implementation manners, the elastic abutting portion 13 may also be an elastic element disposed on the carrying surface 120, for example, two or more springs or at least one rubber or the like. The lock portion 14 is directly fixed onto the carrying surface 120, and the elastic element is fixed to the carrying surface 120 and surrounds the lock portion 14.

The driving device of the propulsion system of the present disclosure is provided thereon with an elastic abutting member and a lock portion. The lock portion is provided thereon with at least one first snap-fitting portion to be clamped with the propeller, and an inner wall of the receiving hole of the propeller is provided thereon with at least one second snap-fitting portion snapped with the first snap-fitting portion. The elastic abutting member is used for abutting against the connecting surface. Such a structural design is not only easy to disassemble but also has a locking function, which, in addition, can prevent the propeller from coming off and leading to a propeller runaway.

Those of ordinary skill in the art should realize that the above implementation manners are merely used to describe the present disclosure, but are not used as limitations to the present disclosure. Proper changes, and variations made to the above embodiments within the essential spirit and scope of the present disclosure all fail within the protection scope of the present disclosure.

What is claimed is:
1. A propulsion system, comprising:
a propeller comprising:
 a hub having a receiving hole;
 a plurality of blades connected to the hub; and
 a connecting surface; and
a driving device coupled with the propeller, the driving device comprising:
 a body portion;
 an elastic abutting member disposed on the body portion and configured to abut against the connecting surface; and
 a lock portion disposed on the body portion, the lock portion including a first snap-fitting portion,
wherein a second snap-fitting portion is arranged on an inner wall of the receiving hole and is configured to snap with the first snap-fitting portion.

2. The propulsion system of claim 1, wherein a stopping block is disposed on the second snap-fitting portion along a rotation direction of the blades during operation.

3. The propulsion system of claim 1, a cylindrical connecting post is arranged inside the receiving hole and includes a connecting hole configured to connect with a driving shaft of the driving device.

4. The propulsion system of claim 3, wherein at least one reinforcing plate is disposed on an outer sidewall of the connecting post.

5. The propulsion system of claim 3, wherein the driving shaft is connected with the connecting hole through interference fit.

6. The propulsion system of claim 1, wherein the driving device further comprises a mounting base, and the body portion is fixedly arranged at the mounting base.

7. The propulsion system of claim 6, wherein the body portion comprises a carrying surface away from the mounting base, and the carrying surface includes a round receiving groove.

8. The propulsion system of claim 7, wherein the elastic abutting member comprises:
a connecting plate received in the receiving groove; and
a plurality of elastic abutting portions elastically bending relative to the connecting plate and configured to abut against the propeller when the first snap-fitting portion is snapped with the propeller.

9. The propulsion system of claim 8, wherein:
a plurality of first mounting holes surrounding the driving shaft are provided at a bottom of the receiving groove, the first mounting holes being threaded holes,
the connecting plate includes a plurality of second mounting holes corresponding to positions of the plurality of first mounting holes, the lock portion comprises a bottom plate including a plurality of third mounting holes corresponding to the positions of the plurality of first mounting holes, and two bolts pass through the second mounting holes and the third mounting holes to be connected with the first mounting holes by threading to fix the elastic abutting member and the lock portion on the carrying surface.

10. The propulsion system of claim 9, wherein:

the connecting plate includes a first through hole corresponding to a position of the driving shaft, the bottom plate includes a second through hole corresponding to the position of the driving shaft, and the first through hole and the second through hole are configured for the driving shaft to pass through.

11. The propulsion system of claim 7, wherein the elastic abutting member is an elastic element disposed on the carrying surface.

12. The propulsion system of claim 11, wherein the elastic element includes two or more springs.

13. The propulsion system of claim 11, wherein the elastic element includes rubber.

14. The propulsion system of claim 1, wherein the elastic abutting portion and the lock portion are fixed on a carrying surface of the body portion by adhesion or welding.

15. The propulsion system of claim 8, wherein a thickness of the connecting plate is about the same as a depth of the receiving groove.

16. The propulsion system of claim 1, wherein the lock portion comprises an extension portion extending upwards along a direction perpendicular to a bottom plate of the lock portion, and the first snap-fitting portion is disposed on the extension portion.

17. The propulsion system of claim 16, wherein the extension portion further includes at least two notches.

18. The propulsion system of claim 1, wherein the second snap-fitting portion is an arc-shaped snapping block.

19. The propulsion system of claim 18, wherein:

the second snap-fitting portion has an extension direction along a rotation direction of the blades, and includes a first end and a second end in the extension direction, a first stopping block protrudes along an axial direction of the receiving hole from a first end of the second snap-fitting portion, a second stopping block protrudes along the axial direction from a second end of the snapping block, and the first snap-fitting portion is clamped between the first stopping block and the second stopping block.

20. The propulsion system of claim 19, wherein a height of the first stopping block in the axial direction is greater than a height of the second stopping block in the axial direction.

* * * * *